United States Patent [19]
Loffredo et al.

[11] Patent Number: 5,833,140
[45] Date of Patent: Nov. 10, 1998

[54] VARIABLE GEOMETRY EXHAUST NOZZLE FOR A TURBINE ENGINE

[75] Inventors: Constantino V. Loffredo, Newington; Charles J. Szyszko, Glastonbury, both of Conn.

[73] Assignee: United Technologies Corporation, Hartford, Conn.

[21] Appl. No.: 764,420

[22] Filed: Dec. 12, 1996

[51] Int. Cl.⁶ ................................................. B64C 15/02
[52] U.S. Cl. ......................... 239/265.37; 60/242; 60/271
[58] Field of Search ........................ 239/265.19, 265.33, 239/265.37; 60/226.1, 242, 262, 271

[56] References Cited

U.S. PATENT DOCUMENTS

| | | | |
|---|---|---|---|
| 2,481,330 | 9/1949 | Neal | 60/35.5 |
| 2,840,985 | 7/1958 | Elliott | 60/35.6 |
| 2,997,842 | 8/1961 | Colley | 60/35.6 |
| 3,612,399 | 10/1971 | Rodgers et al. | 239/265.19 |
| 4,000,611 | 1/1977 | McCardle, Jr. et al. | 60/230 |
| 4,068,469 | 1/1978 | Adamson | 60/226.1 |
| 4,327,548 | 5/1982 | Woodward | 60/226.1 |
| 4,440,347 | 4/1984 | Madden et al. | 239/265.39 |
| 4,449,678 | 5/1984 | Hapke | 244/12.5 |
| 4,463,902 | 8/1984 | Nightingale | 239/265.17 |
| 4,485,970 | 12/1984 | Fournier et al. | 239/265.29 |
| 4,509,923 | 4/1985 | Turnbull | 440/43 |
| 4,587,806 | 5/1986 | Madden | 60/271 |
| 4,763,840 | 8/1988 | Madden | 239/265.35 |
| 5,016,818 | 5/1991 | Nash et al. | 239/127.1 |
| 5,038,560 | 8/1991 | Seed | 60/226.1 |
| 5,082,181 | 1/1992 | Brees et al. | 239/265.37 |
| 5,102,050 | 4/1992 | Sedziol et al. | 239/265.35 |
| 5,181,676 | 1/1993 | Lair | 244/110 B |
| 5,221,048 | 6/1993 | Lair | 239/265.37 |
| 5,310,117 | 5/1994 | Fage et al. | 239/265.29 |

*Primary Examiner*—Charles G. Freay
*Attorney, Agent, or Firm*—Kenneth C. Baran

[57] ABSTRACT

A variable exhaust nozzle (26) for a turbine engine nacelle (16) includes a pair of semi-cowls (58, 60) disposed about a longitudinally extending central axis (14) and a pair of corresponding shells (36, 38) each of which is spaced radially inwardly from the corresponding semi-cowl and is pivotable about a pivot axis (42, 44) between an extended position and a retracted position. The semi-cowls and shells have curved, geometrically similar inner and outer surfaces (86, 100) respectively so that gap (108) between the shells and the cowl is uniform irrespective of the angular orientation of the shells. A seal (128) which includes longitudinally extending legs (128a, 128b) and an optional circumferential leg (128c) prevents detrimental air leakage. Pivotal movement of the shells effects large changes in the discharge area $A_D$ of the nozzle without compromising the external aerodynamic characteristics of the nacelle. In one embodiment of the invention, each shell includes an extension (110) which facilitates the attainment of large area changes. The radial uniformity of gap (108) contributes to the durability and simplicity of the seal by ensuring that the seal is not repeatedly compressed and relaxed during operation of the nozzle.

14 Claims, 7 Drawing Sheets

VARIABLE GEOMETRY EXHAUST NOZZLE FOR A TURBINE ENGINE

TECHNICAL FIELD

This invention relates to a variable geometry exhaust nozzle for a gas turbine engine nacelle and particularly to a nozzle which achieves large area changes without adversely affecting the aerodynamic characteristics of the nacelle or the fuel efficiency of the engine.

BACKGROUND OF THE INVENTION

Commercial gas turbine aircraft engines are optimized to exhibit peak efficiency during high altitude cruise operation, where the major part of an engine's utilization takes place, and to emit as little objectionable noise as possible. Such optimization relies in part on the use of a fan having large span, wide chord blades which draw a large quantity of ambient air into the engine. A majority of that air flows through a fan duct and is subsequently discharged through a fan exhaust nozzle whose discharge area is sized to achieve the best possible performance and efficiency. However when the engine is operated at a low altitude and at the high power settings typically needed for aircraft takeoff, the quantity of air drawn into the engine may exceed the flow capacity of the fan exhaust nozzle. Consequently, the nozzle can backpressure the fan and induce fan stall, a violent aerodynamic instability which can cause considerable engine damage and which temporarily but significantly reduces the power output of the engine.

One way to avoid fan stall is to use variable pitch fan blades, each of which is rotatable about a radially extending pitch axis. The blades are rotated in unison about their pitch axes so that the quantity of air drawn into the engine remains within the flow capacity of the fan exhaust nozzle. However variable pitch fan blades have not met with widespread acceptance for use in commercial gas turbines due to the perceived weight, bulk, cost and complexity of the associated actuation system.

Another way to avoid fan stall is to use an exhaust nozzle whose discharge area is adjustable to conform the flow capacity of the nozzle to the quantity of air drawn through the fan. Conventional variable geometry exhaust nozzles utilize moveable components such as pivotable shells or hinged flaps which are selectively positionable to modify the geometry of the nozzle and thereby modulate its discharge area. Seals between the nozzle components help to minimize engine fuel consumption by guarding against air leakage. While many types of variable geometry exhaust nozzles have been devised, they are primarily applicable to small diameter engines where the necessary variation in nozzle discharge area is achievable with only modest adjustments of the moveable components. At the larger diameters typical of modern turbofan engines, larger adjustments are required to effect a proportionately equivalent area variation, and these larger adjustments may adversely affect the nacelle's external profile and therefore its aerodynamic characteristics. The actuation system for achieving these larger adjustments may also be correspondingly heavier and bulkier, a distinct disadvantage in aircraft installations where excess weight is unacceptable and space is at a premium. Moreover, it is desirable that the nozzle seals be simple, durable and highly effective, attributes which are not evident in many conventional variable geometry nozzles. In short, prior art variable geometry exhaust nozzles fail to blend the conflicting demands of large area variability, consistently good aerodynamic performance, and effective intercomponent sealing in a mechanically simple package.

SUMMARY OF THE INVENTION

It is, therefore, an object of the invention to provide a variable geometry exhaust nozzle which is capable of large area variations with minimal effect on the nozzle's external profile and aerodynamic characteristics.

It is a further object of the invention to provide a variable geometry nozzle configured for maximum simplicity, effectiveness and durability of its intercomponent seals.

According to the invention, a variable geometry exhaust nozzle includes a pair of fixed semi-cowls and a pair of shells spaced radially inwardly from the semi-cowls so that the shells are pivotable with respect to the semi-cowls and wherein the inner surface of each semi-cowl and the outer surface of each shell are geometrically similar curved surfaces so that the space between the shells and the semi-cowls is radially uniform and independent of the angular orientation of the shells.

According to one aspect of the invention, each shell includes a longitudinal extension so that large variations in nozzle discharge area can be achieved without adversely affecting the external aerodynamic characteristics of the nacelle.

In one embodiment of the invention, a seal extends across the space between each shell and the corresponding semi-cowl inner surface to discourage air leakage through the space and minimize engine fuel consumption.

The primary advantage of the invention is that the pivotable shells enable large variations in the nozzle discharge area while providing a geometrically uniform environment for the seal so that the seal's effectiveness and durability are maximized. The ability to achieve large area variations can be significantly facilitated by the extensions which prevent drag inducing airflow separation from the exterior of the nacelle even when the shells are pivoted through a large angular displacement.

The foregoing features and advantages and the operation of the invention will become more apparent in light of the following description of the best mode for carrying out the invention and the accompanying drawings.

BRIEF DESCRIPTION OF THE DRAWINGS

FIG. 6 is a schematic illustration showing a means for defining the geometrically similar surfaces of the semi-cowls and the nozzle shells.

BEST MODE FOR CARRYING OUT THE INVENTION

Figure 1:
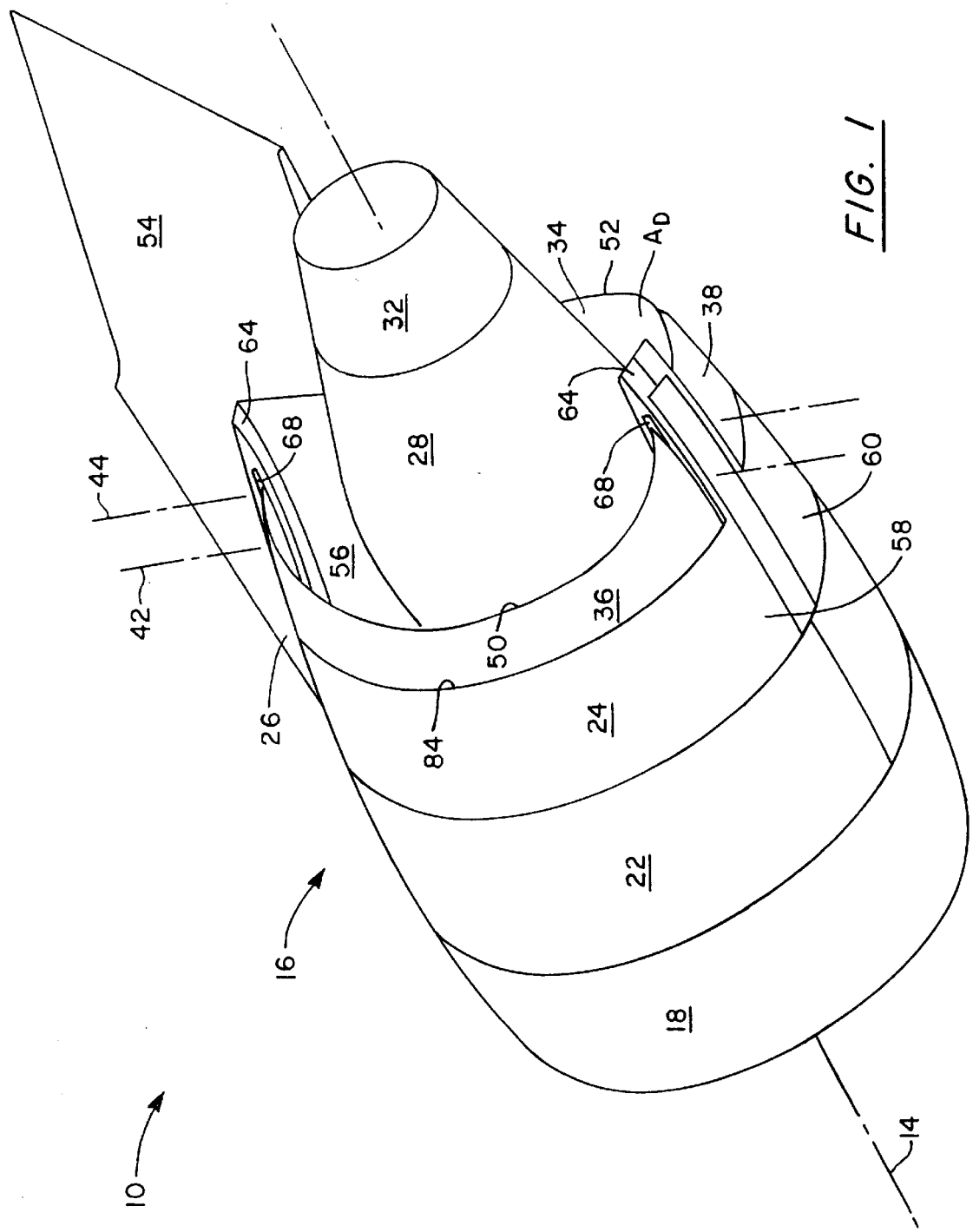
FIG. 1 is a perspective view of a turbofan engine nacelle having a variable geometry exhaust nozzle of the present invention and showing the nozzle in its maximum discharge area position.
Figure 2:
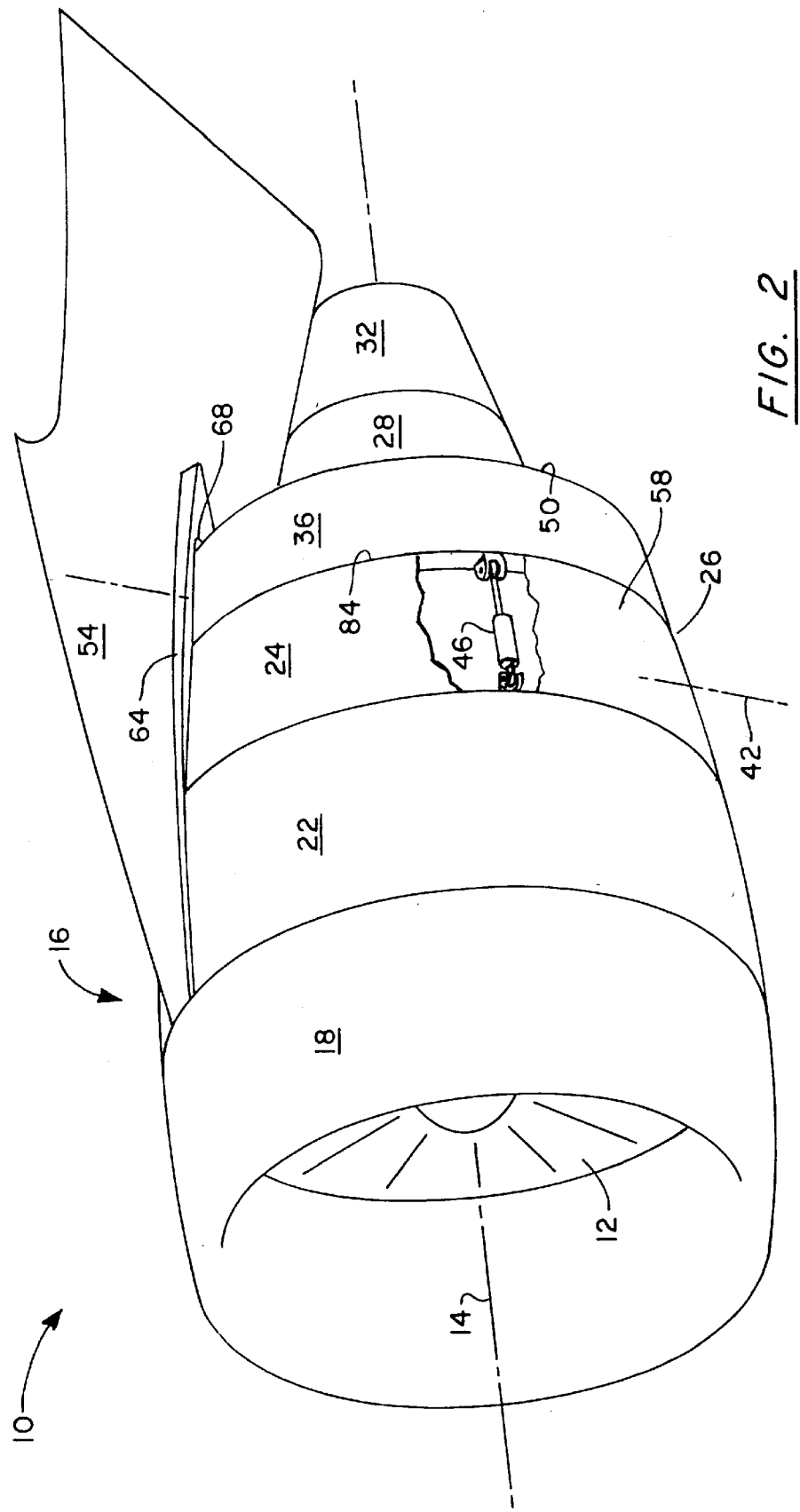
FIG. 2 is a perspective view of a turbofan engine nacelle having a variable geometry exhaust nozzle of the present invention and showing the nozzle in its minimum discharge area position.

Referring to FIGS. 1 and 2, a turbofan gas turbine engine 10 includes an array of fan blades 12 which is rotatable about a longitudinally extending central axis 14. The engine is housed within an aerodynamically streamlined nacelle 16. The nacelle includes an inlet 18, forward and aft fan cowls 22, 24, a fan exhaust nozzle indicated generally at 26, a core cowl 28 and a core exhaust nozzle 32. The fan cowls and fan exhaust nozzle cooperate with a centerbody such as the core cowl to radially bound a working medium flowpath such as annular fan duct 34. As explained more fully hereinafter, the fan exhaust nozzle includes left and right shells 36, 38, each of which is pivotable about respective pivot axes 42, 44 between a retracted position (FIG. 1) and an extended position (FIG. 2). An actuation system, as indicated by actuator 46 for left shell 36 (FIG. 2), is provided to pivot the shells about the pivot axes thereby varying the annular discharge area $A_D$ defined by the core cowl and trailing edges 50, 52 of the shells.

A pylon 54 extends radially outwardly from the engine and connects the engine to an aircraft wing (not shown) and includes a bifurcation 56 which extends radially across the fan duct 34, dividing the aft fan cowl 24 into left and right semi-cowls 58, 60 corresponding to the left and right shells 36, 38. Fairings 64 extend longitudinally along the circumferential edges of the semi-cowls. Recesses 68 in each fairing receive the peripheral edges 72 (FIGS. 3, 5) of each shell so that the edges are enveloped by the fairings irrespective of the angular orientations of the shells.

Figure 3:
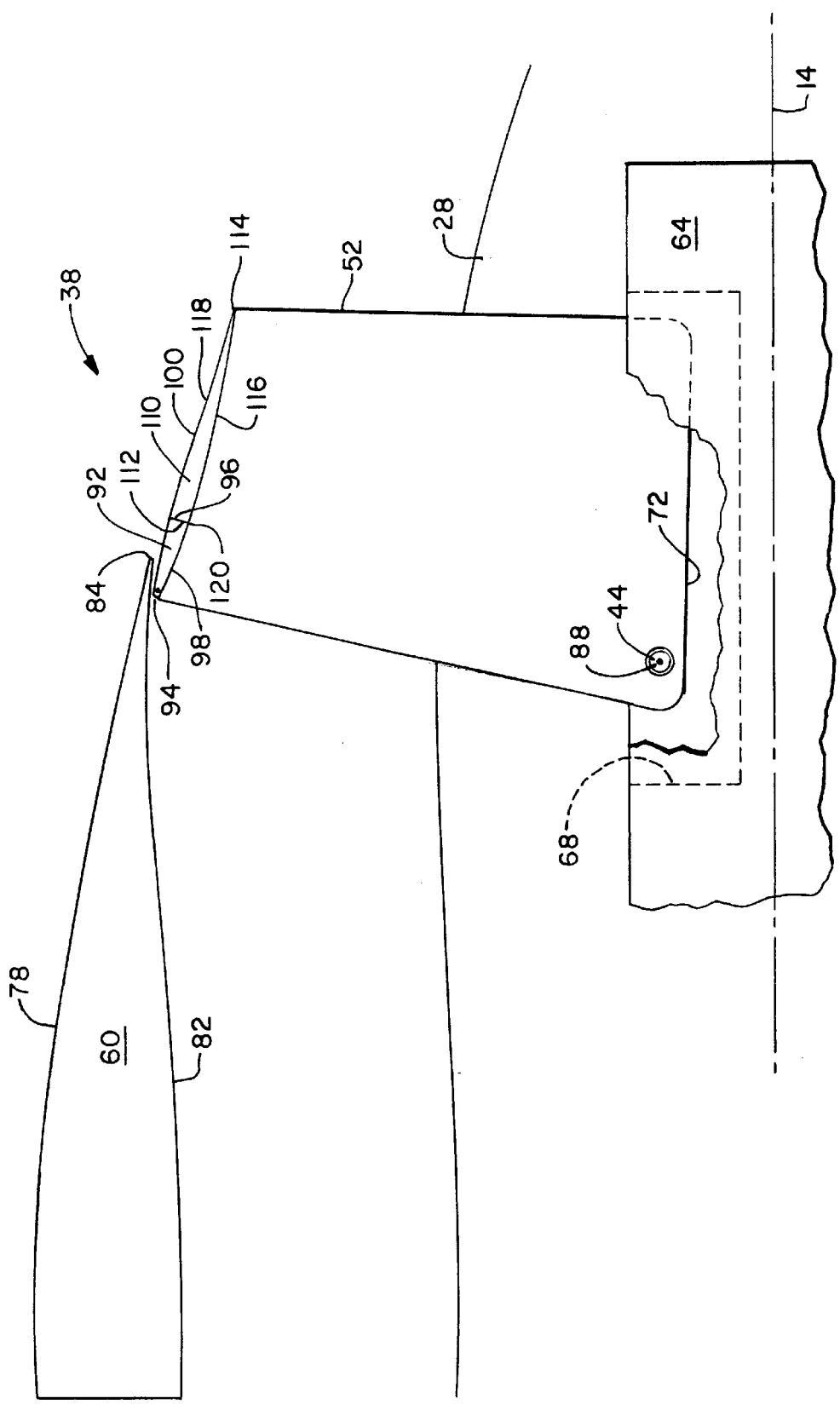
FIG. 3 is a plan view of a portion of the nacelle of FIG. 2 showing the right side of an exhaust nozzle comprising a semi-cowl and a pivotable shell having curved, geometrically similar inner and outer surfaces respectively over portions of their lengths.
Figure 4:
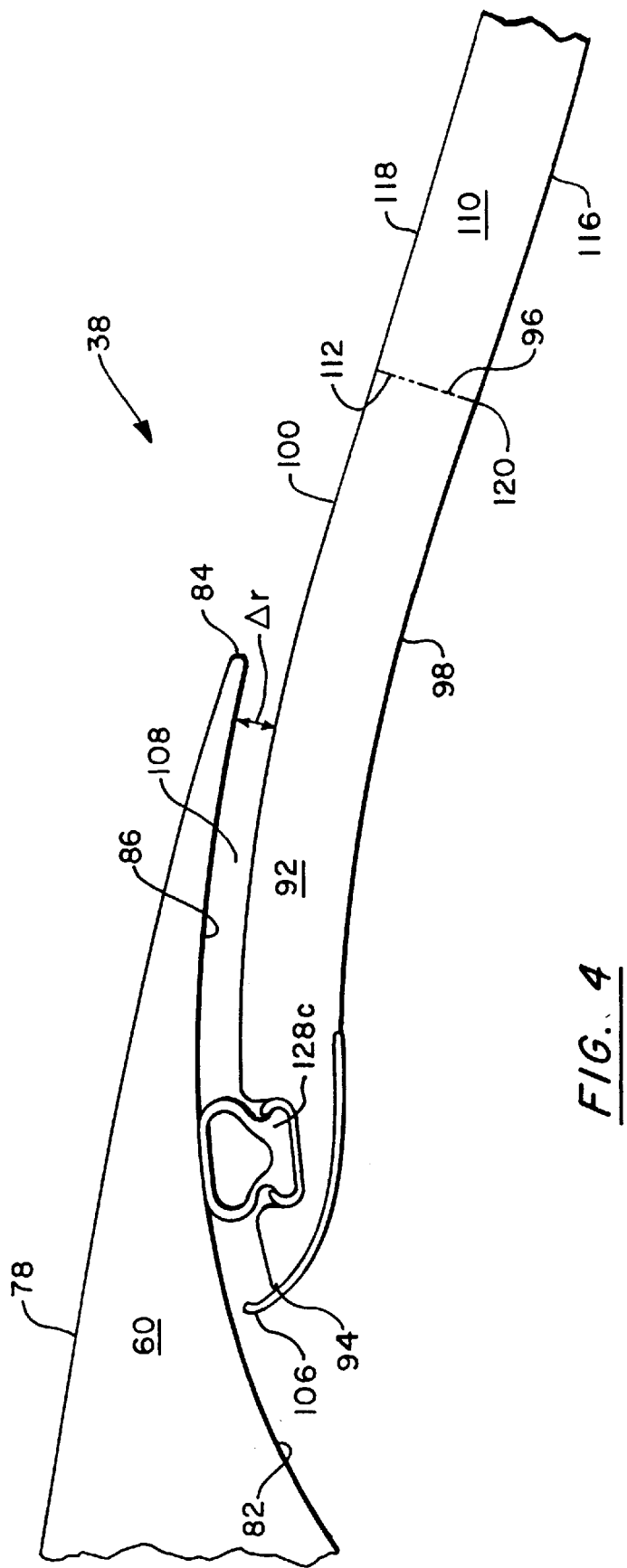
FIG. 4 is a plan view similar to FIG. 3 showing the leading edge region of the pivotable shell and the trailing edge region of the semi-cowl in greater detail.

Referring now to FIGS. 3 and 4, each semi-cowl, such as right semi-cowl 60, has an outer surface 78 and an inner surface 82 joined together at a semi-cowl trailing edge 84. A portion of each semi-cowl inner surface immediately forward of the cowl trailing edge is a first curved surface 86. As explained more fully hereinafter, the first curved surface is defined with respect to a generating axis 88 which is coincident with the semi-cowl's pivot axis 44.

In a preferred embodiment of the invention, each nozzle shell comprises a panel 92 and a physically integral but functionally distinct extension 110 which extends aftwardly of the panel. The panel has a leading edge 94, an inner surface 98 and an outer surface 100 which is a second curved surface with respect to the generating axis 88. The second curved surface is geometrically similar to the first curved surface of the corresponding semi-cowl and is spaced radially inwardly therefrom leaving a radially uniform gap 108 therebetween. The extension 110 has a trailing edge 114, an inner surface 116 and an outer surface 118 which is typically a partial surface of revolution such as a partial frustoconical surface whose axis of symmetry is axis 14. Boundary 120 between panel 92 and extension 110 is positioned so that it is no further forward than the cowl trailing edge when the shell is pivoted to its retracted position. By observing this constraint, mechanical interference between the semi-cowl inner surface and the shell outer surface (specifically the extension outer surface) is precluded. Ideally boundary 120 is longitudinally coincident with semi-cowl trailing edge 84 when the shell is in its retracted position.

Each panel's pivot axis 42, 44 is perpendicular to and laterally offset from the central axis and is located forward of the corresponding semi-cowl trailing edge. In practice, each pivot axis is embodied in a suitable pivot mechanism such as the trunnion 124 and bearing 126 arrangement illustrated in FIG. 5 so that the angular orientation of each panel is adjustable between a retracted position (FIG. 1) and an extended position (FIG. 2) to regulate the fan nozzle discharge area $A_D$.

Figure 5:
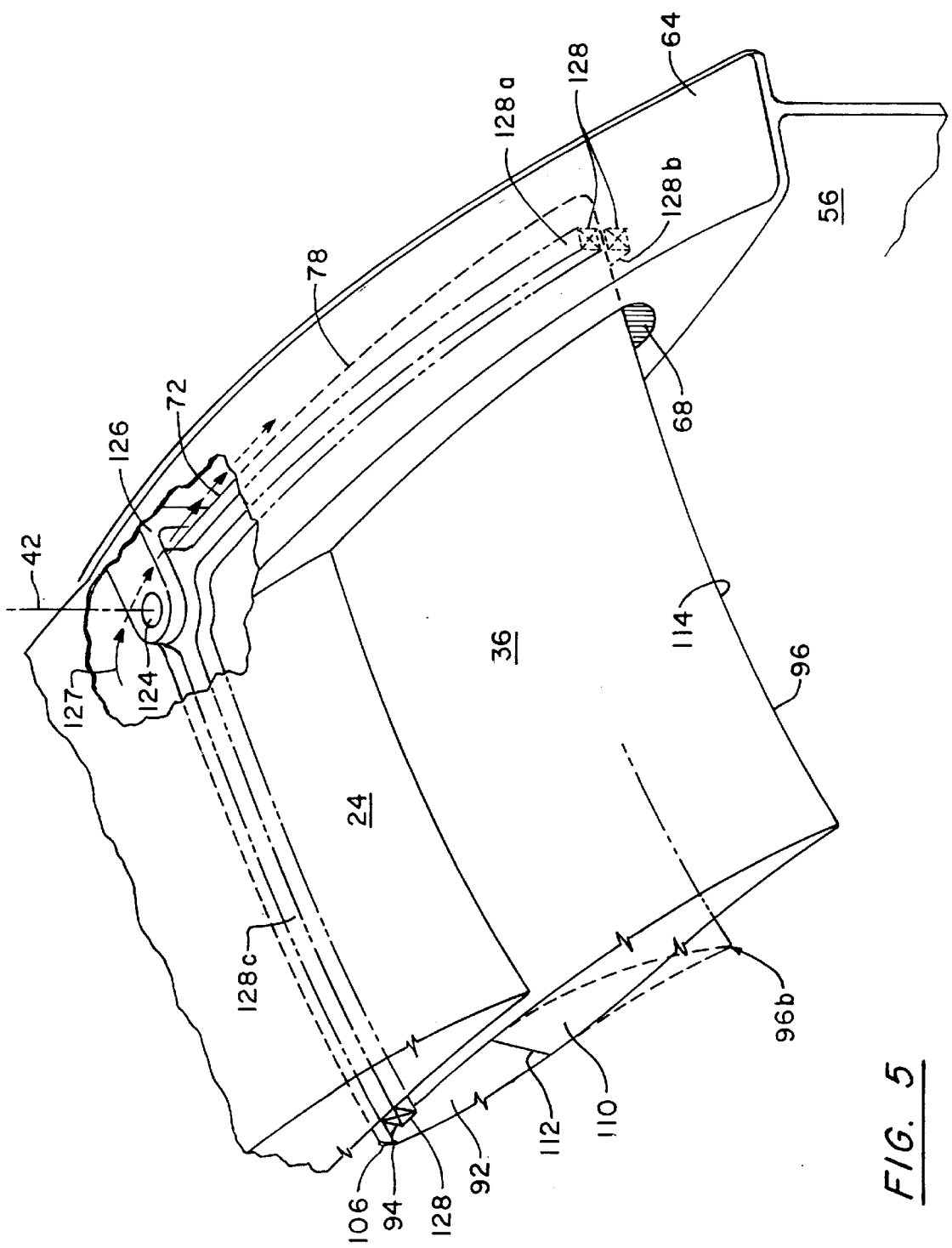
FIG. 5 is a perspective view showing a trunnion and bearing arrangement for securing a pivotable shell to a nacelle bifurcation and schematically illustrating a seal between the shell and the associated semi-cowl.
Figure 5:
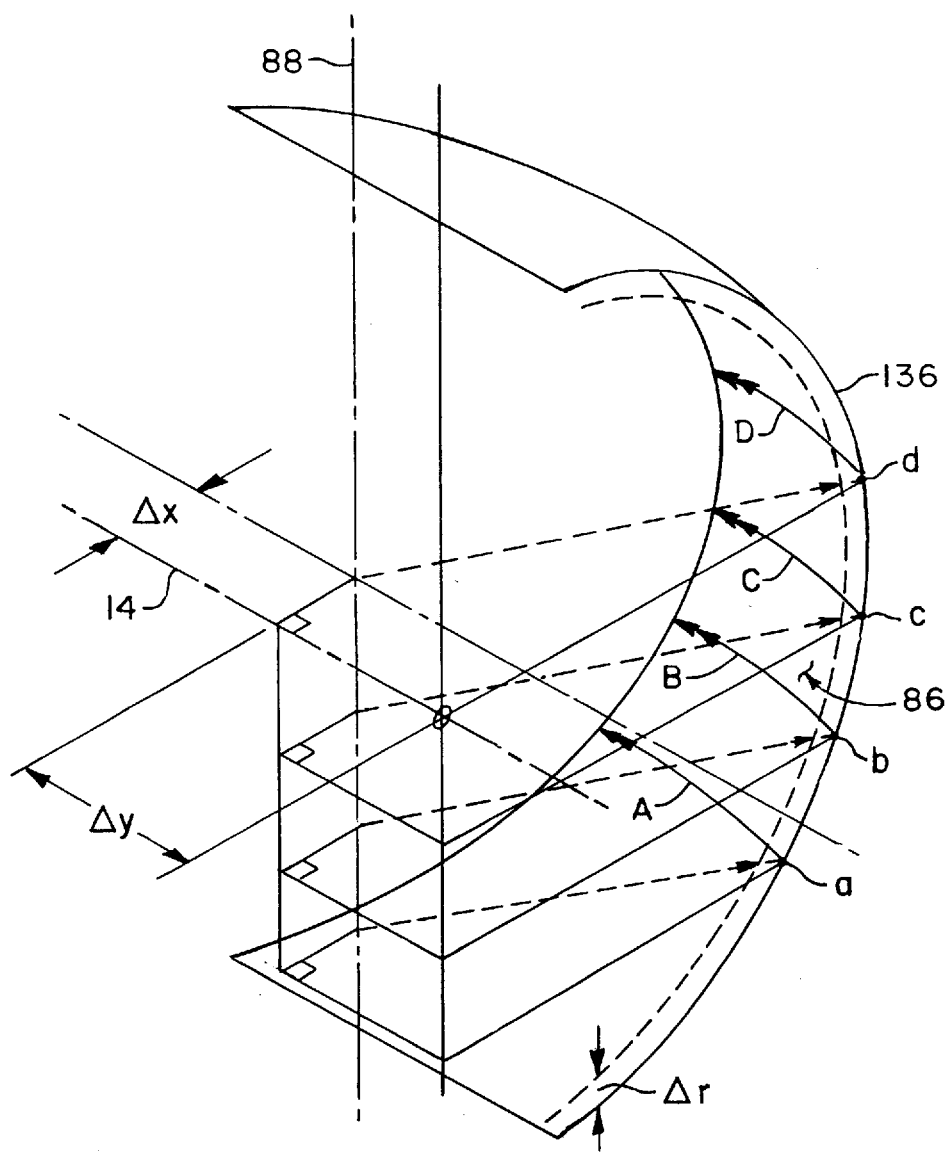

Referring to FIGS. 4 and 5, the leading edge 94 of each pivotable shell includes a lip 106 which flares radially outwardly toward the respective semi-cowl so that the transition between semi-cowl inner surface 82 and panel inner surface 98 is aerodynamically streamlined. An airseal 128 includes longitudinally extending legs 128a, 128b anchored respectively to the interior and exterior of the shell and a circumferentially extending leg 128c. Circumferential leg 128c extends between each shell and the cowl inner surface to impede the leakage of working medium gases into gap 108 thereby precluding frictional flow losses which would occur due to air flowing longitudinally through the gap. Longitudinal legs 128a, 128b seal the spaces between the shell surfaces and the inner perimeter of recess 68 so that any air which leaks, as indicated by arrow 127, around the circumferential extremities of leg 128c in the vicinity of the pivot mechanism is trapped within the recess. Alternatively, the sealing arrangement can be simplified by using longitudinal seal legs exclusively without the circumferential leg 128c. In this case, the above described frictional flow losses will be present, however spillage drag and base drag induced at panel leading edge 94 and at semi-cowl trailing edge 84 respectively will be minimized. Elimination of the circumferential leg 128c may also contribute to a reduction in the size of the actuators 46 by eliminating the mechanical friction between the seal leg and the semi-cowl inner surface 86.

The means by which surfaces 86, 100 are defined is illustrated schematically in FIG. 6. Using the right semi-cowl as an example, the trailing edge of the semi-cowl is a generatrix for defining the semi-cowl inner surface in the vicinity of the trailing edge and is ideally a circular arc 136 centered on the central axis 14. Since the generating axis 88 is coincident with the pivot axis, the generating axis is perpendicular to the central axis, is laterally offset therefrom by a distance $\Delta x$, and is located forward of the trailing edge by a distance $\Delta y$. Semi-cowl inner surface 86 is the surface defined by rotating arc 136 about the generating axis 88 so that the arc sweeps out the curved surface 86. For example, points a, b, c and d on the arc sweep out curves A, B, C, and D respectively on the surface. The corresponding outer surface of each nozzle panel is defined similarly except that the generatrix curve is radially offset from the semi-cowl trailing edge by a predetermined distance $\Delta r$ (FIGS. 4, 6). Although a non-circular generatrix curve can be used to define the surfaces, a circular arc is preferred since the resulting semi-cowl and nozzle shell will be capable of withstanding high hoop stresses without significant structural reinforcement.

During operation of the engine, the actuators 46 respond to commands of a control system (not shown) to pivot the shells about their respective pivot axes. Typically, the shells are pivoted symmetrically so that the engine exerts a substantially longitudinally directed propulsive force for all angular orientations of the shells. The shells are pivoted to their extended position (FIGS. 2 and 3) during high altitude cruise operation. With the shells in this extended position, the shell trailing edges (which in the embodiment of FIGS.

3 and 4 are the extension trailing edges 114), typically describe circular arcs when viewed parallel to the central axis, and the nozzle discharge area AD is minimized to ensure optimum engine efficiency during the lengthy intervals of time spent at cruise conditions. During the relatively brief intervals of high power operation at low altitude, theshells are pivoted to their retracted position (FIG. 1) to maximize the nozzle discharge area. The enlarged discharge area, which is at least twenty percent greater than the minimum discharge area, ensures sufficient nozzle flow capacity to preclude fan stall and reduces the discharge velocity of the working medium gases to minimize noise. Operation at any angular orientation between these extremes may be desirable to optimize engine performance at conditions other than cruise or takeoff and a nozzle whose shells are deployable at intermediate positions is within the scope of the invention.

Figure 7:
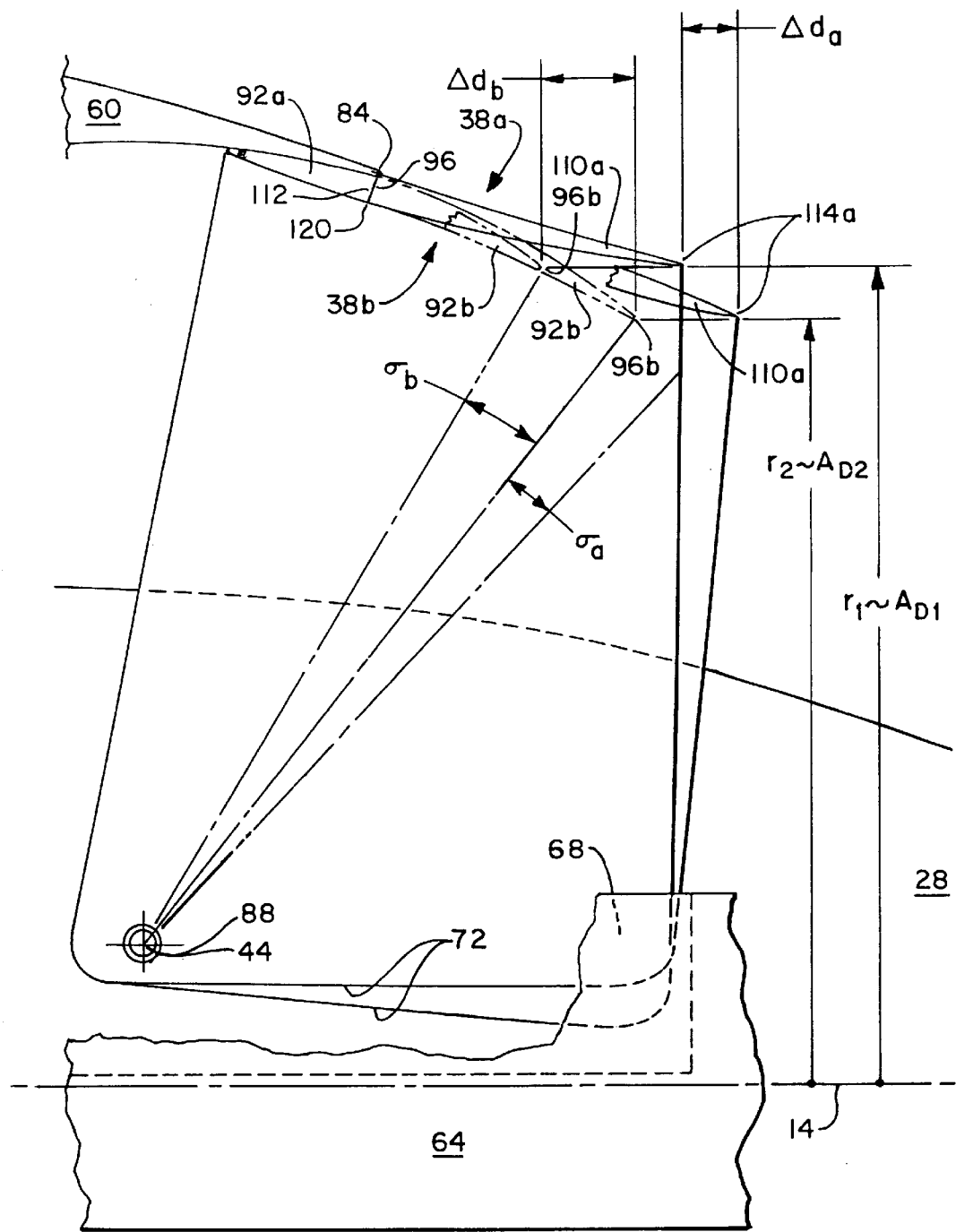
FIG. 7 is a plan view comparing the external profiles of alternative embodiments of the exhaust nozzle in their minimum and maximum area positions.

One advantage of the above described exhaust nozzle having a panel 92 and an extension 110 is appreciated by reference to FIG. 7. A nozzle shell 38a comprising a curved panel 92a and an extension 110a is illustrated in two orientations—a first orientation whose discharge area $A_{D2}$, corresponds to radius $r_2$ and a second orientation whose discharge area $A_{D2}$ corresponds to radius $r_2$. Superimposed on the illustration are corresponding orientations of a nozzle shell 38b having only panel 92b. As is clear from the illustration, the nozzle without the extension converges precipitously toward the central axis 14 to achieve an area reduction from $A_{D1}$ to $A_{D2}$. The severity of this convergence can result in airflow separation from the external surface of the shell with a resultant dramatic increase in the nacelle's aerodynamic drag. By contrast, the nozzle shell 38a having the extension 110a converges toward the axis far more gradually to achieve the same area change, and therefore is significantly less likely to induce airflow separation.

If the core cowl converges toward the central axis, as is conventional, the advantage of the extension is amplified. In the presence of a converging core cowl, the discharge area reduction attributable to pivotal movement of shell 38a or $\Delta b$ is partially offset by the accompanying aftward displacement $\Delta d_a$ or $\Delta d_b$ of the shell trailing edge (114a or 96b) acting in concert with the diminishing diameter of the core cowl 28. Thus, the attainment of a desired area reduction in the presence of a converging core cowl requires greater pivotal movement of the shell than would be required in the presence of a constant diameter core cowl. This greater pivotal movement exaggerates the convergence of the shell outer surface toward the central axis and increases the likelihood that the extension will be necessary to prevent airflow separation.

Another advantage of a nozzle having an extension is that the change in angular orientation, $\sigma_a$ required to achieve a desired area reduction is smaller than the corresponding angular change $\sigma_b$ necessary to achieve the same area reduction without an extension. This further minimizes any adverse effect on the external contour of the nacelle and minimizes the size and weight of actuation system 46.

A further advantage of the invention is apparent in FIG. 4. As the shell 38 is pivoted, the similar surfaces of revolution 86, 100 ensure that the size of gap 108 remains uniform so that seal 128 is not repeatedly compressed and relaxed, as would be the case if the gap was variable. As a result, the actuation forces will be repeatable and predictable. Moreover, the seal will be highly durable and can be of a simple, inexpensive design.

Although the preferred embodiment of the invention includes shells having both a panel such as panel 92 and an extension such as extension 110, the invention also embraces a nozzle whose shell includes panel 92 but not extension 110. In this embodiment, the panel tapers to a trailing edge such as edge 96b (FIG. 7), and edge 96b is the trailing edge of the shell. As is clear from the prior discussion, such a configuration is more susceptible to airflow separation but nevertheless may be attractive if only modest area variations are required. In addition, although a core cowl 28 or a similar centerbody is typical of modern turbofan engines, the invention embraces an arrangement in which the centerbody is absent. Finally, although the nozzle shells have been described as symmetrically pivotable, they may also be nonsymmetrically pivotable if it is desired to orient the propulsive force of the engine in a direction nonparallel to the central axis.

We claim:

1. An exhaust nozzle for a turbine engine, comprising:
a cowl disposed about a longitudinally extending central axis and comprising two semi-cowls, each semi-cowl having an outer surface and an inner surface joined together at a cowl trailing edge, a portion of each semi-cowl inner surface being a first curved surface having an generating axis which is perpendicular to the central axis and located longitudinally forwardly of the cowl trailing edge; and
a pair of shells each corresponding to one of the semi-cowls, each shell including a panel having a leading edge, a trailing edge, an inner surface and an outer surface, each panel being pivotable about a pivot axis substantially coincident with the corresponding generating axis between an extended position and a retracted position, each panel outer surface being a second curved surface spaced radially inwardly from the corresponding semi-cowl inner surface thereby defining a uniform gap between each panel outer surface and the corresponding semi-cowl inner surface.

2. A variable exhaust nozzle for a turbine engine, comprising: a cowl disposed about a longitudinally extending central axis and comprising two semi-cowls, each semi-cowl having an outer surface and an inner surface joined together at a cowl trailing edge, a portion of each semi-cowl inner surface being a first curved surface having an generating axis which is perpendicular to the central axis and located longitudinally forwardly of the cowl trailing edge; and
a pair of shells each corresponding to one of the semi-cowls, each shell including a panel having a leading edge, an inner surface and an outer surface, each panel being pivotable about a pivot axis substantially coincident with the corresponding generating axis between an extended position and a retracted position, each panel outer surface being a second curved surface spaced radially inwardly from the corresponding semi-cowl inner surface thereby defining a uniform gap between each panel outer surface and the corresponding semi-cowl inner surface, each shell also including an extension extending aftwardly from the panel, each extension having a trailing edge that defines a trailing edge of the corresponding shell, and the extension being a partial surface of revolution.

3. A variable exhaust nozzle for a turbine engine, comprising:
a cowl disposed about a longitudinally extending central axis and comprising two semi-cowls, each semi-cowl having an outer surface and an inner surface joined together at a cowl trailing edge, a portion of each semi-cowl inner surface being a first curved surface having an generating axis which is perpendicular to the central axis and located longitudinally forwardly of the cowl trailing edge;

a pair of shells each corresponding to one of the semi-cowls, each shell including a panel having a leading edge, a trailing edge, an inner surface and an outer surface, each panel being pivotable about a pivot axis substantially coincident with the corresponding generating axis between an extended position and a retracted position, each panel outer surface being a second curved surface spaced radially inwardly from the corresponding semi-cowl inner surface thereby defining a uniform gap between each panel outer surface and the corresponding semi-cowl inner surface; and a centerbody which cooperates with the cowl and the shells to radially bound a working medium flowpath.

4. A variable exhaust nozzle for a turbine engine, comprising:

a cowl disposed about a longitudinally extending central axis and comprising two semi-cowls, each semi-cowl having an outer surface and an inner surface joined together at a cowl trailing edge, a portion of each semi-cowl inner surface being a first curved surface having an generating axis which is perpendicular to the central axis and located longitudinally forwardly of the cowl trailing edge;

a pair of shells each corresponding to one of the semi-cowls, each shell including a panel having a leading edge, an inner surface and an outer surface, each panel being pivotable about a pivot axis substantially coincident with the corresponding generating axis between an extended position and a retracted position, each panel outer surface being a second curved surface spaced radially inwardly from the corresponding semi-cowl inner surface thereby defining a uniform gap between each panel outer surface and the corresponding semi-cowl inner surface, each shell also including an extension extending aftwardly of the panel, each extension having a trailing edge that defines a trailing edge of the corresponding shell, and the outer surface of the extension being a partial surface of revolution; and a centerbody which cooperates with the cowl and the shells to radially bound a working medium flowpath.

5. The exhaust nozzle of claims 2 or 4 wherein the outer surface of the extension is frustoconical.

6. The exhaust nozzle of claims 1, 2, 3 or 4 wherein the generating axis is laterally offset from the central axis.

7. The exhaust nozzle of claims 3 or 4 wherein the shell trailing edges and the centerbody define a nozzle discharge area and the discharge area with the shells in the retracted position is at least twenty percent greater than the discharge area with the shells in the extended position.

8. The exhaust nozzle of claims 1, 2, 3 or 4 wherein the shells are symmetrically pivotable about their respective pivot axes so that the engine exerts a substantially longitudinally directed propulsive force for all angular orientations of the shells.

9. The exhaust nozzle of claim 2 or 4 wherein a boundary defined between each panel and the extension is no further forward than the cowl trailing edge when the panels are in the retracted position.

10. The exhaust nozzle of claim 1, 2, 3 or 4 wherein the leading edge of each panel is flared so that the transition between the semi-cowl inner surface and the shell outer surface is aerodynamically streamlined.

11. The exhaust nozzle of claim 1, 2, 3 or 4 wherein each shell includes peripheral edges each of which is received by a recess in a fairing, each recess having an inner perimeter, the exhaust nozzle including a seal comprising at least a longitudinally extending leg for sealing a space between the peripheral edge of the shell and the inner perimeter of the recess.

12. The exhaust nozzle of claims 1 or 2 wherein the shell trailing edges define a nozzle discharge area, and the discharge area with the shells in the retracted position is at least twenty percent greater than the discharge area with the shells in the extended position.

13. A variable exhaust nozzle for a turbine engine, comprising:

a cowl disposed about a longitudinally extending central axis and comprising two semi-cowls, each semi-cowl having an outer surface and an inner surface joined together at a cowl trailing edge, a portion of each semi-cowl inner surface being a first curved surface having an generating axis which is perpendicular to the central axis and located longitudinally forwardly of the cowl trailing edge; and a pair of shells each corresponding to one of the semi-cowls, each shell including a panel having a leading edge, an inner surface and an outer surface, each panel being pivotable about a pivot axis substantially coincident with the corresponding generating axis between an extended position and a retracted position, each panel outer surface being a second curved surface situated radially inwardly of the corresponding semi-cowl inner surface, each shell also including an extension extending aftwardly from the panel, each extension having a trailing edge that defines a trailing edge of the corresponding shell, and the extension being a partial surface of revolution.

14. The exhaust nozzle of claim 13 comprising a centerbody which cooperates with the cowl and the shells to radially bound a working medium flowpath.

* * * * *